(12) United States Patent
Ohishi

(10) Patent No.: US 7,498,941 B2
(45) Date of Patent: Mar. 3, 2009

(54) IC TAG COMMUNICATION SYSTEM

(75) Inventor: Satoshi Ohishi, Mishima (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 161 days.

(21) Appl. No.: 11/366,174

(22) Filed: Mar. 2, 2006

(65) Prior Publication Data

US 2007/0063845 A1      Mar. 22, 2007

(30) Foreign Application Priority Data

Sep. 22, 2005    (JP) .............................. 2005-276590

(51) Int. Cl.
*G08B 13/14* (2006.01)
*G08B 19/00* (2006.01)
*H04Q 5/22* (2006.01)
*H04B 1/02* (2006.01)
*H01Q 1/00* (2006.01)

(52) U.S. Cl. .............. 340/572.1; 340/572.2; 340/572.4; 340/572.5; 340/572.6; 340/572.7; 340/10.1; 340/10.2; 340/10.34; 340/5.65; 455/107; 343/754; 343/757; 343/758

(58) Field of Classification Search .................. None
See application file for complete search history.

(56) References Cited

U.S. PATENT DOCUMENTS

| | | | | |
|---|---|---|---|---|
| 5,523,749 A | * | 6/1996 | Cole et al. | ................ 340/10.34 |
| 6,946,950 B1 | * | 9/2005 | Ueno et al. | ................. 340/10.1 |
| 2003/0125067 A1 | * | 7/2003 | Takeda et al. | ................ 455/522 |
| 2005/0280508 A1 | * | 12/2005 | Mravca et al. | ............. 340/10.2 |
| 2006/0017634 A1 | * | 1/2006 | Meissner | ..................... 343/742 |
| 2006/0170565 A1 | * | 8/2006 | Husak et al. | ........... 340/825.49 |

FOREIGN PATENT DOCUMENTS

JP      2001-116583      4/2001

* cited by examiner

*Primary Examiner*—Julie Lieu
(74) *Attorney, Agent, or Firm*—Pearne & Gordon LLP

(57) ABSTRACT

An IC tag communication system according to an aspect of the present invention includes: a plurality of reader antennas which receive radio waves emitted from an IC tag attached to an article, the radio waves being at least partly overlapped with each other; a plurality of readers which are connected respectively to the reader antennas; and a phase adjustment section for adjusting the phases of the radio waves that the reader antennas receive to each other.

9 Claims, 4 Drawing Sheets

IC TAG COMMUNICATION SYSTEM

CROSS-REFERENCE TO RELATED APPLICATIONS

This application is based upon and claims the benefit of priority from the Japanese Patent Application No. 2005-276590, filed on Sep. 22, 2005, the entire contents of which are incorporated herein by reference.

BACKGROUND OF THE INVENTION

1. Field of the Invention

The present invention relates to an IC tag communication system provided with a plurality of reader antennas.

2. Description of the Related Art

Although a passive-type IC tag is convenient as it has no power source of its own, it requires a supply of sufficient power for its operation. Therefore, a communication distance between a reader (reader unit) of an RFID tag system using the passive-type IC tag and the passive-type IC tag depends upon whether an IC chip in the IC tag receives sufficient power for its activation and whether an answering wave from the IC chip can be received by a reader antenna. In order to increase a communication distance, the following two methods can be considered: (1) Increase an output from the reader antenna; and (2) Reduce power required to activate the IC chip. However, the method of (1) is limited in terms of regulation, influence on other devices, influence on the human body, and the like and it is technically difficult to overcome the limitations. Although the method of (2) has been improved in various aspects, there is a limitation in the power reduction.

For these reasons, there is a certain degree of limitation on the communication distance of the passive-type IC tag. Thus, in the case where the communication distance exceeds a certain threshold, the RFID system needs to use an active-type IC tag having power source of its own. However, since the active-type IC tag has a power source as described above, the tag becomes expensive, leading to increased cost of the entire system.

Further, in order to increase the communication distance of the passive-type IC tag, a system having a plurality of reader antennas has been proposed. In this case, a supply of power to the IC tag is controlled by switching the reader antennas. For example, Jpn. Pat. Appln. Laid-Open Publication No. 2001-116583 discloses a destination guidance system that detects the current area of the RFID based on which antenna a signal from the RFID (IC tag) has been received by.

However, irrespective of using the passive-type or active-type IC tag, a use of a plurality of reader antennas creates interference issue between the IC tag and the antennas, preventing a satisfactory communication between the IC tag and reader unit.

The present invention has been made in view of the above problem involved in the conventional IC tag communication system and an object thereof is to provide an IC tag communication system capable of satisfactorily communicating with an IC tag in a configuration having a plurality of reader antennas.

According to an aspect of the present invention, there is provided an IC tag communication system including: a plurality of reader antennas which receive radio waves emitted from an IC tag attached to an article, the radio waves being at least partly overlapped with each other; a plurality of readers which are connected respectively to the reader antennas; and a phase adjustment section for adjusting the phases of the radio waves that the reader antennas receive to each other.

According to the aspect, an IC tag communication system capable of satisfactorily communicating with an IC tag in a configuration having a plurality of reader antennas can be obtained.

DETAILED DESCRIPTION OF THE INVENTION

Embodiments of the present invention will be described below with reference to the accompanying drawings.

<First Embodiment>

Figure 1:
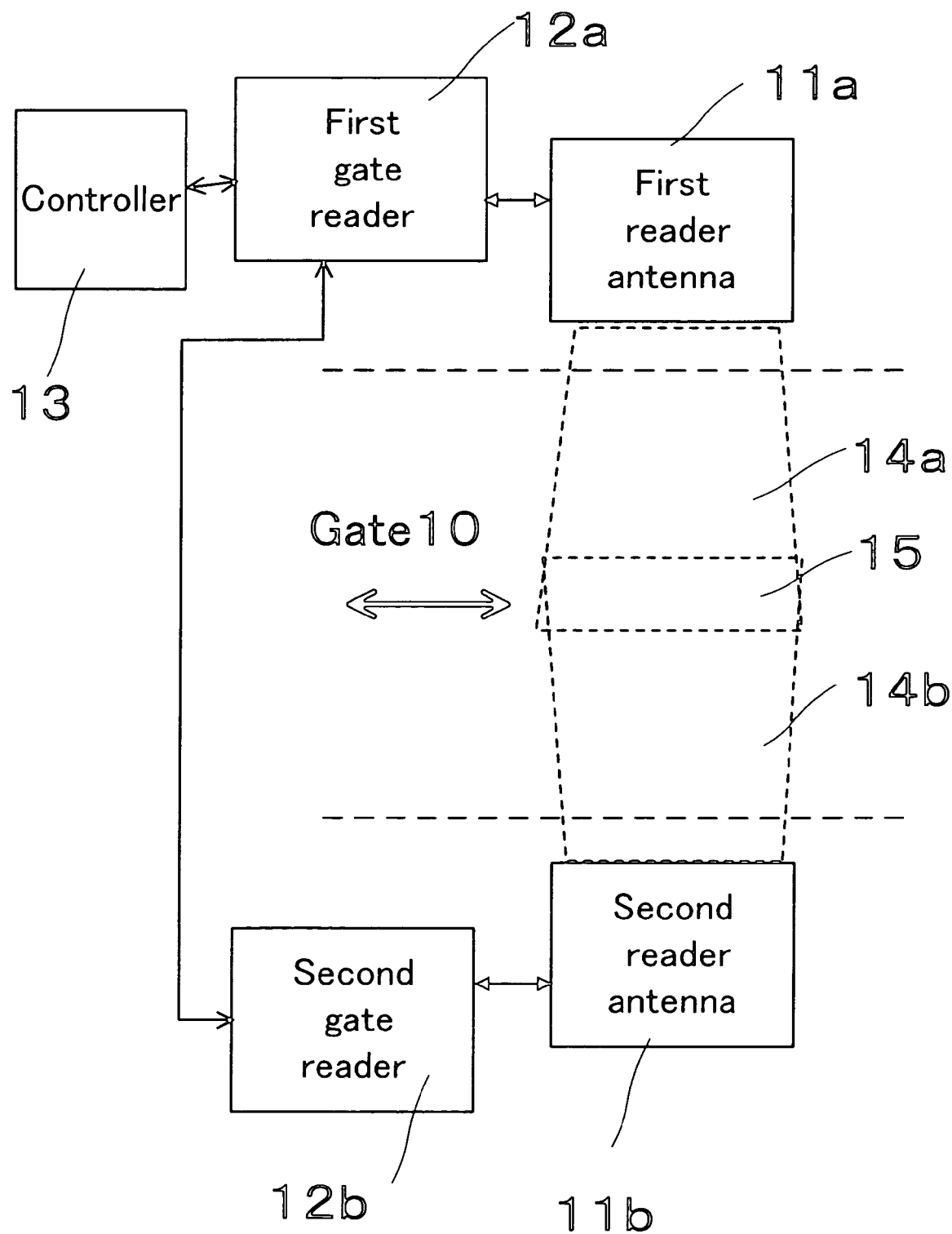
FIG. 1 is a view showing the entire configuration of an embodiment of the present invention.

FIG. 1 shows an example of the entire configuration of an embodiment in which an IC tag communication system of the present invention has been applied to a gate type system. A passive-type IC tag is used in this configuration.

The system includes: a first reader antenna 11a and a second reader antenna 11b which are disposed opposite to each other across a gate 10; a first gate reader 12a and a second gate reader 12b which are respectively connected to the first and second reader antennas 11a and 11b through cables; and a controller 13 which controls the first gate reader 12a. The second gate reader 12b includes only a transmission/reception signal processing section and a second antenna transmission/reception section and, accordingly, only has a function of controlling radio waves emitted from the second reader antenna 11b and processing information of an IC tag based on the received radio waves.

Figure 2:
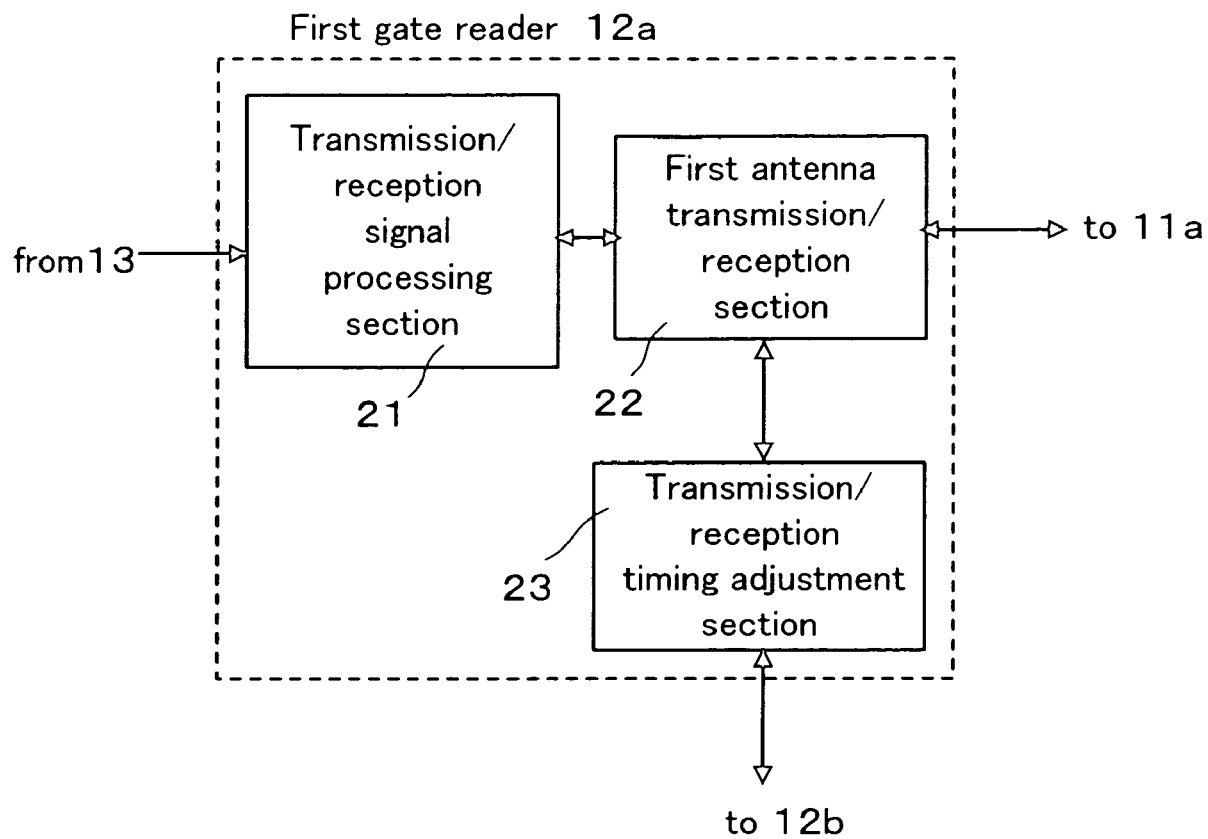
FIG. 2 is a configuration example of a gate reader in the embodiment of the present invention.

The first gate reader 12a includes, as shown in FIG. 2, not only a transmission/reception signal processing section 21 which receives a control signal from the controller 13 and processes transmission/reception signals and a first antenna transmission/reception section 22 which controls radio waves transmitted to and from the first reader antenna 11a but also a transmission/reception timing adjustment section 23 which adjusts relative phases of radio waves transmitted to and from the first and second reader antennas 11a and 11b. Although not shown, a delay circuit which can automatically or manually change delay time is provided in the transmission/reception timing adjustment section 23.

In the system, an article carried by a person passes through a gate 10, the article being attached with a passive-type IC tag. Radio waves are emitted from the first and second reader antennas 11a and 11b toward the gate 10. An area 14a denotes a first read/write area in which, when an IC tag is detected within the area 14a by radio waves emitted from the first reader antenna 11a, read/write of the content from/to the detected IC tag is performed by the first gate reader 12a. Similarly, an area 14b denotes a second read/write area in which, when an IC tag is detected within the area 14b by radio waves emitted from the second reader antenna 11b, read/write of the content from/to the detected IC tag is performed by the second gate reader 12b. An area 15 in which the above areas 14a and 14b are overlapped with each other denotes an overlapped read/write area in which read/write of the content from/to the detected IC tag is performed by both the first and second gate readers 12a and 12b.

Next, operation of the first embodiment will be described. The IC tag communication system according to the first embodiment has two operation modes: an adjustment mode and a communication mode. In the adjustment mode, the phase of radio waves emitted from the first reader antenna 11a and that of radio waves emitted from the second reader antenna 11b are adjusted to each other. In the communication mode, communication between the IC tag passing through the gate 10 and the system is performed.

Firstly, in the adjustment mode, a radio transmitter operating at a frequency that can be transmitted/received by the first and second reader antennas 11a and 11b is temporarily set in the center of the area 15. The radio waves that the radio transmitter emits is received by the first and second reader antennas 11a and 11b and then processed by the respective transmission/reception sections of the first and second gate readers 12a and 12b. Information carried on the radio waves that has been received by the second reader antenna 11b is sent, through the second gate reader 12b, to the transmission/reception timing adjustment section 23 of the first gate reader 12a, where the phases of the radio waves received by the first and second reader antennas 11a and 11b are compared to each other. In the case where the phases of the reception radio waves are shifted from each other, a delay circuit provided in the transmission/reception timing adjustment section 23 changes delay time to allow the above two phases to correspond to each other.

Figure 3:
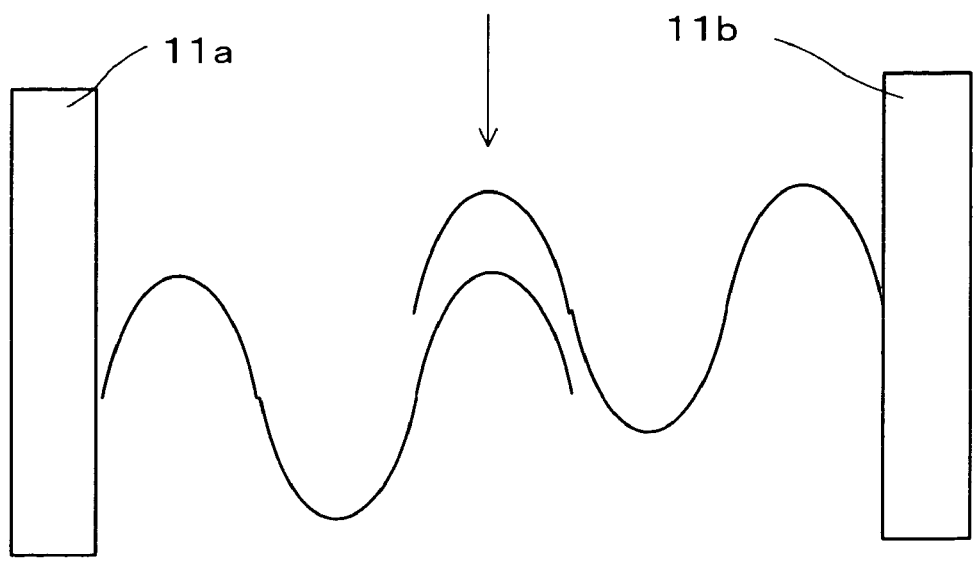
FIG. 3 is a view for explaining adjustment of the phases of radio waves in the embodiment of the present invention.

In the subsequent communication mode, information is read out from the IC tag attached to an article passing through the gate 10. At this time, the phases of the radio waves emitted from the first and second reader antennas 11a and 11b correspond to each other at the center position of the gate, as shown in FIG. 3. Accordingly, in the case where the IC tag passes through this area, the radio waves emitted from the first and second reader antennas 11a and 11b are reinforced by each other to allow a signal transmitted from the IC tag to be received by both the first and second reader antennas 11a and 11b.

Figure 4:
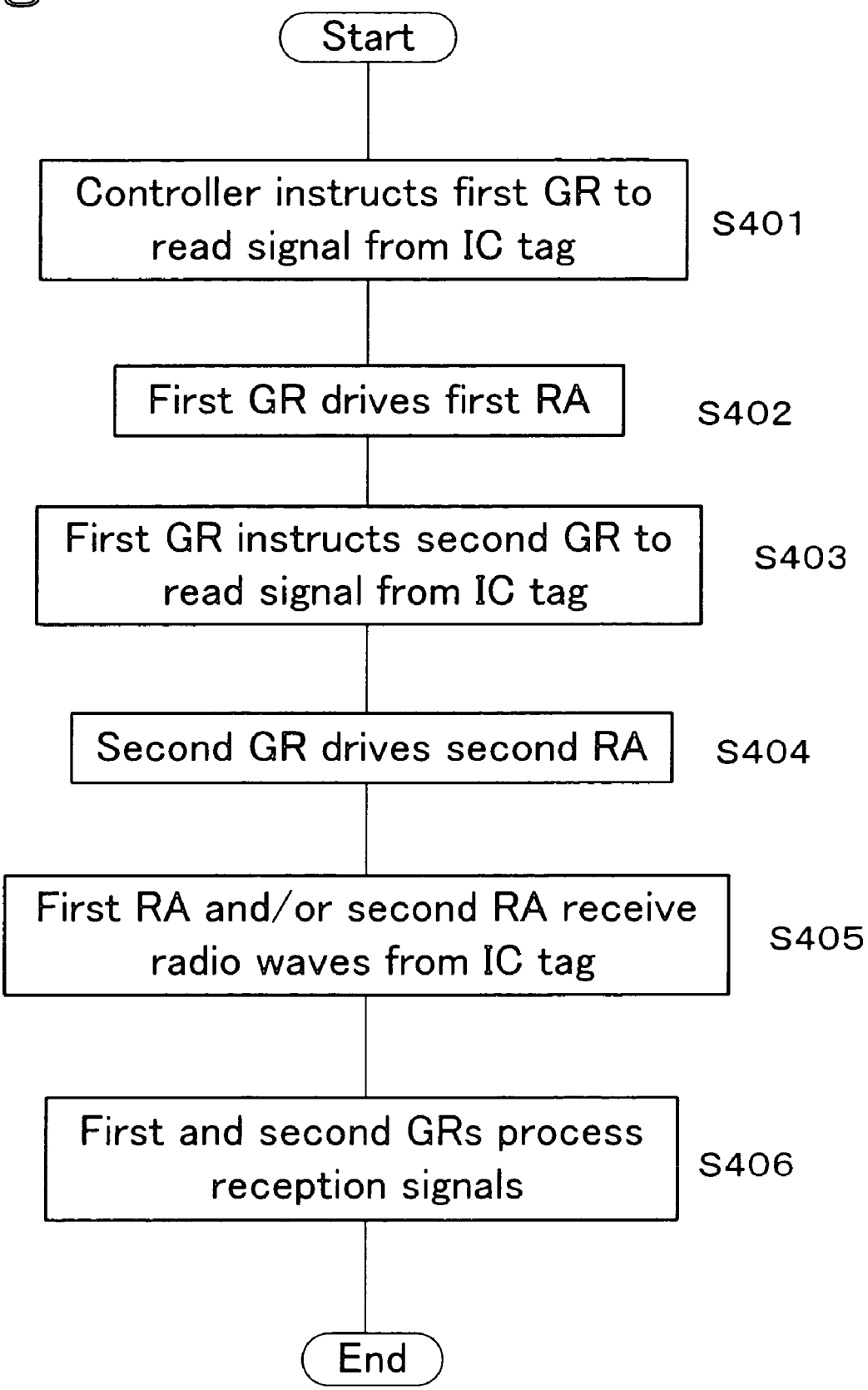
FIG. 4 is a flowchart for explaining operation of the embodiment of the present invention.

The operation in the communication mode will be described based on the flowchart shown in FIG. 4. In step S401, the controller 13 instructs the first gate reader (GR) 12a to read a signal from the IC tag. Upon receiving the instruction, the first gate reader 12a drives the first reader antenna 11a to allow the antenna 11a to emit radio waves toward the gate 10 in step S402.

In step S403, the first gate reader 12a instructs the second gate reader 12b to read out a signal from the IC tag. Upon receiving the instruction, the second gate reader 12b drives the second reader antenna 11b and instructs the antenna 11b to emit radio waves toward the gate 10 in step S404.

A signal is transmitted from the IC tag when the IC tag is passing through the area 15 of the gate 10. The transmitted signal is received by the first and second reader antennas 11a and 11b (step S405).

Since the phase of radio waves emitted from the first reader antenna and that of radio waves emitted from the second reader antenna are adjusted to each other as described above in the description of the adjustment mode, signals to be received by the first and second reader antennas are not weakened.

In the case where the IC tag passes not through the area 15, but through the area 14a or 14b, the radio waves from the IC tag is received by one of the first and second reader antennas 11a and 11b. Thereafter, the first and second gate readers process the reception signals and thereby information of the IC tag is extracted.

Although the controller 13 controls the second gate reader 12b through the first gate reader 12a in the above embodiment, the controller 13 may directly control both the first and second gate readers 12a and 12b.

As described above, by shifting the phases of the radio waves transmitted/received by the first and second reader antennas, sufficient power can be supplied from both the antennas to the passive-type IC tag, allowing both the antennas to receive a satisfactory signal from the IC tag. As a result, it is possible to realize a gate reader that can read out information from a large sized article and a large amount of articles by using the passive-type IC tag.

<Second Embodiment>

Figure 5:
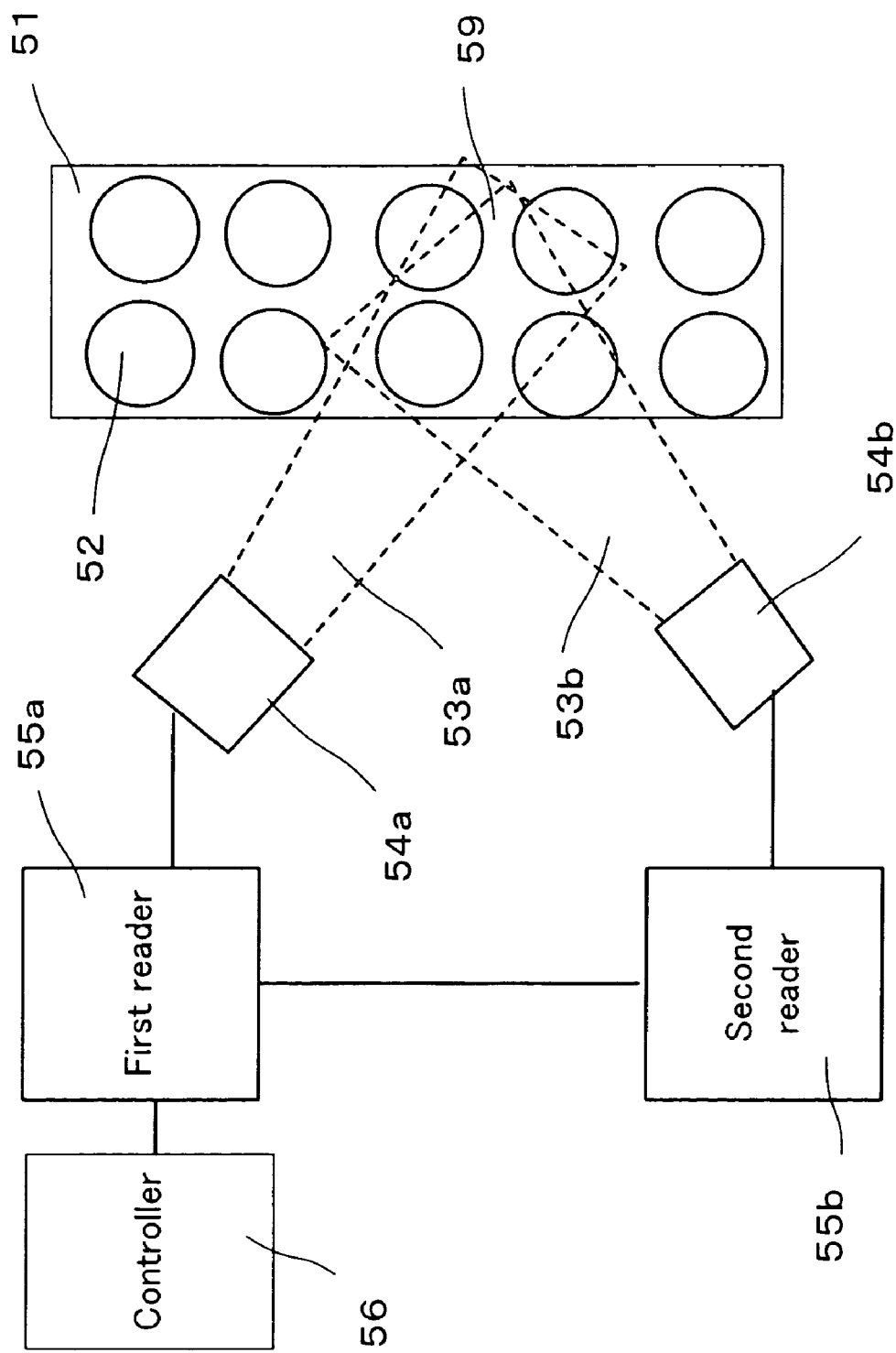
FIG. 5 is a view showing the entire configuration of another embodiment of the present invention.

Next, another embodiment in which the present invention has been applied to a system using a stationary reader will be described with reference to FIG. 5.

The stationary reader reads out information of an IC tag existing within its read area, records a database in the tag as well as time and location at the read time to take information indicating when and where what kind of articles (or who) is existing into the system and is applied for location management of not only goods, such as stock management, book stock management, book stock check management but also people.

The system according to the second embodiment includes first and second reader antennas 54a and 54b each of which receives radio waves from an IC tag attached to an article 52 placed on a shelf 51 in the case where the tag-attached article 52 exists within an independent read area 53a or 53b, first and second readers 55a and 55b which drive the first reader antennas 54a and 54b, and a controller 56 which controls the first reader 55a. The second reader 55b is controlled by the first reader 55a.

Although not shown, the first reader 55a includes a first antenna drive controller which controls the direction of the first reader antenna 54a, a first antenna transmission/reception section, a transmission/reception signal processing section, and a transmission/reception timing adjustment section. Although not shown, the second reader 55b includes a second antenna drive controller which controls the direction of the second reader antenna 54b, a second antenna transmission/reception section, and a transmission/reception signal processing section.

The phases of the radio waves transmitted from the first and second reader antennas 54a and 54b are previously adjusted such that the radio waves are overlapped with each other in an overlapped area 59.

Firstly, the controller 56 outputs, to the first reader 55a, an instruction of reading out information from the IC tag attached to an article periodically or according to an instruction from a user. Upon receiving the instruction, the first reader 55a drives the first reader antenna 54a and, at the same time, instructs the second reader 55b to perform readout operation. The second reader 55b drives the second reader antenna 54b.

The first reader 55a can independently read out information from the IC tag existing within the independent read area 53a of the first reader 55a. Similarly, the second reader 55b can independently read out information from the IC tag existing within the independent read area 53b of the second reader 55b.

In the read area 59 of the first and second readers 55a and 55b in which the radio waves from the first and second reader antennas are overlapped with each other, radio waves only from the first reader antenna 54a or radio waves only from the second reader antenna 54b are too weak to activate the IC chip; whereas, as described above, radio waves emitted from the first and second reader antennas 54a and 54b are overlapped at the same phase to emphasize each other, allowing the IC tag to activate. As a result, information in the IC chip is sent back from the IC tag.

The sent back radio waves are received by the first and second reader antennas 54a and 54b. The information carried on the radio waves is then read out by the first and second readers 55a and 55b and notified to the controller 56.

The first and second readers 55a and 55b rotates the antennas 54a and 54b respectively. With the rotation of the antennas 54a and 54b, it is possible for the readers 55a and 55b to read out information of IC tags of many IC tag-attached articles placed on the shelf 51.

Although the directions of the reader antennas 54a and 54b are changed by the first and second readers 55a and 55b in the second embodiment of the present invention, the directions of both the reader antennas 54a and 54b may be fixed. In this case, the shelf 51 may be moved in the up and down direction in FIG. 5.

According to the second embodiment of the present invention, the first and second reader antennas 54a and 54b can be rotated to change the direction in which they receive radio waves, so that the area of the readout operation of the IC tag can be widened. Further, two reader antennas are used to read out the IC tag. Therefore, it is possible to further widen the readout area to allow the system to read out a lot of information of the articles arranged on the shelf, resulting in a reduction of the number of reader units to be provided in the entire system.

Although the case where the system receives radio waves from the IC tag is described in the above embodiments, the present invention is also applicable to the case where the reader antenna transmits radio waves to write information onto the IC tag.

The present invention is not limited to the above embodiments and various modifications can be made within the technical scope of the present invention.

What is claimed is:

1. An IC tag communication system comprising:
   a pair of reader antennas which are disposed so as to be opposed to each other, and which receive radio waves emitted from an IC tag attached to an article, the radio waves being at least partly overlapped with each other;
   a plurality of readers which are connected respectively to the reader antennas; and
   a phase adjustment section for adjusting the phases of radio waves transmitted by the pair of reader antennas so as to reinforce, at a central location, the radio waves transmitted by the pair of reader antennas,
   wherein the radio waves transmitted by the pair of reader antennas at least partly overlap with each other at the central location.

2. The IC tag communication system according to claim 1, wherein
   the pair of reader antennas are disposed toward a gate so as to be opposed to each other across the gate and which receive radio waves from an IC tag attached to an article passing through the gate, the radio waves being at least partly overlapped with each other.

3. The IC tag communication system according to claim 2, wherein
   the IC tag is a passive-type IC tag.

4. The IC tag communication system according to claim 3, wherein
   the phase adjustment section is provided in one of the gate readers and is controlled by a controller which is connected to the gate reader.

5. An IC tag communication system comprising:
   a pair of reader antennas which are disposed so as to be opposed to each other, and which receive radio waves from IC tags attached to a plurality of articles arranged on a shelf, the radio waves being at least partly overlapped with each other;
   a plurality of readers connected respectively to the reader antennas; and
   a phase adjustment section for adjusting the phases of radio waves transmitted by the pair of reader antennas so as to each reinforce, at a central location, the radio waves transmitted by the pair of reader antennas,
   wherein the radio waves transmitted by the pair of reader antennas at least partly overlap with each other at the central location.

6. The IC tag communication system according to claim 5, wherein
   the IC tag is a passive-type IC tag.

7. The IC tag communication system according to claim 6, wherein
   the phase adjustment section is provided in one of the gate readers and is controlled by a controller which is connected to the gate reader.

8. The IC tag communication system according to claim 7, wherein
   the reader antennas are driven by the readers to which they are respectively connected, and
   the directions of the reader antennas can be changed.

9. The IC tag communication system according to claim 7, wherein
   the directions of the reader antennas are fixed, and
   the shelf is configured to be movable.

* * * * *

UNITED STATES PATENT AND TRADEMARK OFFICE
CERTIFICATE OF CORRECTION

PATENT NO. : 7,498,941 B2  
APPLICATION NO. : 11/366174  
DATED : March 3, 2009  
INVENTOR(S) : Satoshi Ohishi Page 1 of 1

It is certified that error appears in the above-identified patent and that said Letters Patent is hereby corrected as shown below:

In the Claims, column 6, line 29, please remove the word "each" before the word "reinforce".

Signed and Sealed this

Second Day of June, 2009

JOHN DOLL  
*Acting Director of the United States Patent and Trademark Office*